United States Patent Office 3,292,725
Patented Dec. 20, 1966

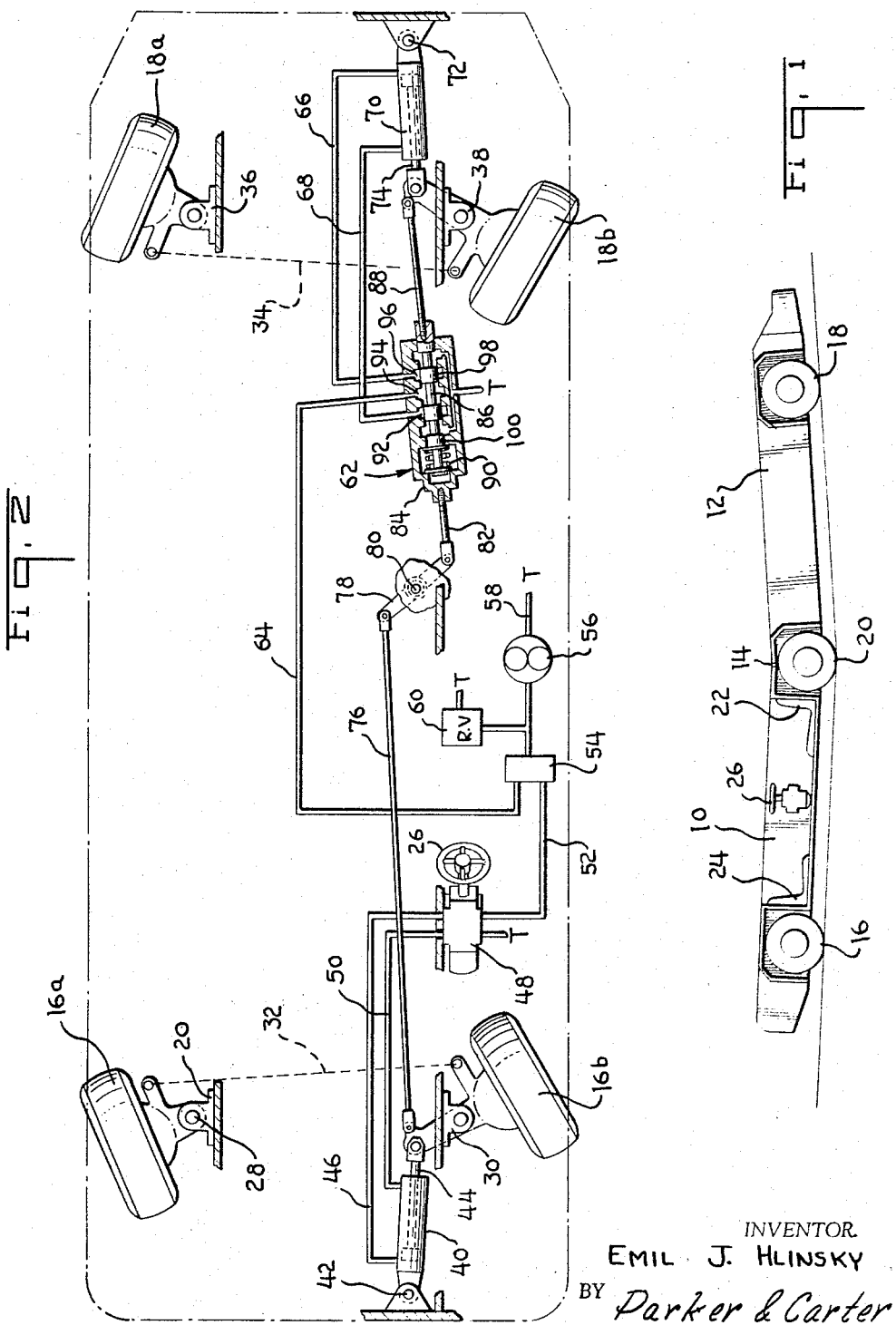

3,292,725
SYNCHRONIZING SYSTEM FOR TANDEM
WHEEL STEERING SYSTEMS
Emil J. Hlinsky, La Grange Park, Ill., assignor, by mesne
assignments, to Westinghouse Air Brake Company,
Pittsburgh, Pa., a corporation of Pennsylvania
Filed Mar. 26, 1965, Ser. No. 442,866
15 Claims. (Cl. 180—79.2)

This invention relates to a power steering apparatus which may be used on mine shuttle cars and the like.

A primary purpose of the invention is a power steering appartus in which wheels on the front and rear, or at spaced locations on a vehicle, may be turned in synchronism.

Another purpose is a power steering apparatus of the type described in which a valve having relatively movable elements is utilized to synchronize the movement of spaced wheels which turn about different fixed points.

Another purpose is a power steering apparatus which is simple in construction and reliably operable.

Another purpose is a fluid operated power steering apparatus using a mechanical connection between spaced wheels in cooperation with a valve having relatively movable elements to insure synchronism between turning wheels.

Another purpose is a power steering apparatus of the type described which may be utilized to control a plurality of pairs of wheels on a single vehicle.

Other purposes will appear in the ensuing specification, drawings and claims.

The invention is illustrated diagrammatically in the following drawings wherein:

FIGURE 1 is a side view of a mine shuttle car which may utilize the power steering apparatus disclosed herein, and FIGURE 2 is a diagrammatic illustration of a mine shuttle car of the type described with the power steering apparatus applied thereto.

Shuttle cars for use in underground mining must turn on the shortest possible radius because of the confined areas in which they operate. Maximum turning effect is obtained by simultaneous turning of both front and rear wheels as contrasted to the turning of only the front wheels on an automobile.

In FIGURE 1, a typical mine shuttle car may include a front section 10 and rear section 12, which are hinged together at 14. There may be front wheels 16, rear wheels 18, and a pair of intermediate wheels 20 which are generally in alignment with the hinged connection between the front and rear sections. The driver of the vehicle may utilize seats 22 or 24 which are both positioned so that the operator may utilize the steering wheel 26 which will be described in detail hereinafter.

Turning now to FIGURE 2, front wheels 16 are designated as wheels 16a and 16b. Wheel 16a may be pivoted about a fixed point or on a bracket 28 attached to the car. In like manner, wheel 16b may be pivoted about a fixed point or about a bracket 30 also attached to the car. There may be a mechanical connection 32 between wheels 16a and 16b so that the wheels turn together. Note that wheel 16b forms a slightly greater angle with the longitudinal axis of the car than wheel 16a. Such a situation is normal in a turn as the wheels are turning on different radii about the same center. The rear wheels 18 may be made up of wheel 18a and wheel 18b, there again being a mechanical connection 34 between the wheels so that they turn together and so that there may be differential turning of the wheels as they round a corner. Wheel 18a may be pivoted on bracket 36 and wheel 18b may be pivoted on bracket 38. Again, both wheels pivot about fixed points.

As shown herein, the wheels are turned by fluid means. The invention should not be limited to such an arrangement, although it is highly advantageous and practical. Any type of fluid drive may be used. Hydraulic and penumatic drives are both satisfactory. A cylinder 40 may be pivoted to the front of the car, as at 42, and its piston 44 may be pivotally connected to the axle of wheel 16b at a point spaced from bracket 30. A line 46 may connect one side of cylinder 40 with valve 48, which may be a conventional Ross valve, the position of which is controlled by steering wheel 26. The other side of cylinder 40 may be connected by a line 50 to valve 48. Valve 48 is effective to supply fluid in the proper direction to cylinder 40 consistent with the operation of steering wheel 26. Fluid is supplied to valve 48 through line 52 from a flow divider 54, with the flow divider being fed by a pump 56 and line 58 which may be connected to a suitable reservoir or tank, not shown. A relief valve 60 may be used to connect the other side of the pump 56 to the tank or reservoir.

A valve, indicated generally at 62, may be connected to flow divider 54 by a line 64, and may be connected by lines 66 and 68 to the opposite ends of a cylinder 70. Cylinder 70 is pivotally attached, as at 72, to the car structure and has a piston 74 which is pivotally connected to the axle of wheel 18b at a point spaced from bracket 38.

A rod 76 may be pivotally connected to the axle of wheel 16b adjacent the pivotal connection of piston 44, and may be pivotally connected at its opposite end to a lever 78. Lever 78 may pivot about a point 80 which is fixed to the underside of the car structure. The opposite end of lever 78 may be pivotally connected to a rod 82, with rod 82 being fixed to housing 84 of the valve 62. Valve 62 includes a valve member or spool 86 which is positioned within the housing and which is fixed to a rod 88. Rod 88 is pivotally connected at its opposite end to the axle of wheel 18b at a point adjacent the pivotal connection of piston 74.

Spool 86 and housing 84 are relatively movable valve elements. A spring 90 is positioned within the housing and may bias or urge spool 86 to the position shown in FIGURE 2. The interior surface of housing 84 is formed with a series of spaced rings or chambers, these chambers being designated at 92, 94 and 96, with lines 68, 64 and 66, respectively, being connected to or opening into chambers 92, 94 and 96. Valve element 86 has raised areas or spools 98 and 100 which, as shown in the position of FIGURE 2, are effective to close off lines 66 and 68 from line 64. In the position of FIGURE 2, no fluid will be supplied to cylinder 70 to turn wheel 18b.

The use, operation and function of the invention are as follows:

When the operator desires to turn the wheels of the car he may do so by operating wheel 26. When the operator turns the steering wheel to turn the car to the left, for example, fluid will be admitted through line 50 to move piston 44 to the position shown. As the piston moves inwardly, or to the left, as shown herein, wheels 16 will be turned so that the vehicle will turn to the left.

As piston 44 moves to the left, rod 76 will be pulled in the same direction to rotate or pivot lever 78 in a counterclockwise direction. This will cause rod 82 to move to the right, as shown in the drawings, and to push the valve housing to the right. As the valve housing moves to the right, valve member or spool 86 remains stationary. Line 64 will be placed in communication with line 68 as spool 100 will then be to the left of chamber 92. Accordingly, fluid is supplied through line 68 to the cylinder 70 to move piston 74 to the right. As piston 74 moves to the right, it will pivot wheel 18b and hence wheel 18a in the direction shown so that the rear wheels will follow the forward wheels as the vehicle turns. As wheel 18b is pivoted in the direction shown, rod 88 will be moved to the right which will move valve member 86 to the right or tend to return the valve member to its original position relative to the position of housing 84. There will be initial movement by the valve housing or one of the relatively movable valve elements to permit operation of the piston 74 and cylinder 70. As piston 74 causes movement of wheel 18b, the movement of the piston will tend to return the relatively movable valve elements to their original position. Initial movement of the valve elements opens valve 62 whereas subsequent movement of the valve elements tends to close the valve and hold the wheels at the position shown.

A turn to the right will move the valve elements in the opposite direction. Initially, housing 84 will move forward, or to the left and after the wheels have turned, spool 86 will move in the same direction.

It should be pointed out at this point that no intermediate wheels have been shown in FIGURE 2. Such wheels are nearly invariable directionally fixed with respect to the longitudinal axis of the car; specifically the wheels are parallel to said axis. It shall also be understood that the wheel linkages 32, 34 are so proportioned that the turning radii of all wheels, including intermediate wheels if present, emanate from a common center at all times. Also, the invention should not be limited to a structure in which the front wheels are the first or primary turning wheels with the rear wheels being the following wheels. The reverse is also practical.

Of particular importance in the invention is the fact that there are no overly long slender rods which take the entire pushing force for turning a wheel. Rod 76 merely transfers motion from wheel 16b to lever 78. This rod never takes the pushing force necessary to turn a wheel. The turning force is supplied by piston 74 and cylinder 70, not by rods 82 and 88. All three rods merely control the operation of valve 62.

Spring 90 functions to largely overcome the looseness and play inherent in any mechanical linkage system. In effect the spring helps keep the valve spool in a neutral position as soon as steady state conditions have been re-established. It will be understood that very small valve movements will actuate the wheels. It is the force supplied through rod 76 and lever 78 which moves the valve elements to a position in which the valve is open so that fluid may be supplied to the piston and cylinder driving the second pair of wheels. The spring assists movement of the second pair of wheels in bringing the valve back to the original position shown in FIGURE 2.

As long as the distance between the pivotal connection of rod 82 and lever 78 and the pivotal connection of rod 88 and wheel 18b is constant, each pair of wheels will will have turned the same amount. The second pair of wheels, or wheels 18, will always follow the turning movement of the first pair of wheels.

Whereas the preferred form of the invention has been shown and described herein, it should be realized that there are many modifications, substitutions and alterations thereto within the scope of the following claims.

I claim:

1. In a power steering apparatus, means for moving a second wheel in synchronism with a first wheel including a valve having relatively movable elements, a mechanical connection between said first wheel and one of said valve elements, a mechanical connection between said second wheel and another of said valve elements, turning movement of said first wheel causing relative movement between said valve elements,
fluid means for moving said second wheel connected to said valve, with said valve being intermediate a source of fluid pressure and said fluid means, relative movement between said valve elements in response to turning movement of said first wheel opening said valve to place said source in communication with said fluid means to move said second wheel, movement of said second wheel causing relative movement between said valve elements, with said valve elements being returned to their original positions when said second wheel has turned an amount generally equal to that of said first wheel.

2. The structure of claim 1 further characterized by and including a generally central pivot point intermediate said first and second wheels, a lever pivoting about said pivot point, one end of said lever being mechanically connected to said first wheel, with the other end of said lever being mechanically connected to said one of said valve elements.

3. The structure of claim 1 further characterized in that said first and second wheels pivot about fixed points.

4. The structure of claim 1 further characterized in that said valve includes a housing and a valve element within the housing, said valve element being movable relative to the housing, with said valve element being mechanically connected to said second wheel, and said housing being mechanically connected to said first wheel.

5. The structure of claim 1 further characterized in that said fluid means includes a piston and cylinder assembly, said second wheel being pivoted about a fixed point, with said piston and cylinder assembly being connected to said second wheel to move it about said fixed point.

6. The structure of claim 1 further characterized in that said valve includes a housing and a spool within the housing, fluid connections between said fluid means and the housing, and a fluid connection from said source to the housing, relative movement between said spool and said housing being effective to place said source in communication with said fluid means, through said housing.

7. In a power steering apparatus, a first wheel and fluid means for turning it, a second wheel and fluid means for turning it, means for moving said second wheel in synchonism with said first wheel including a valve having relatively movable elements, a connection between said valve and the fluid means for turning said second wheel, a source of fluid and a connection between said valve and said source of fluid, said valve being effective to control the passage of fluid from said source to the fluid means for turning said second wheel, mechanical means, operable by turning movement of said first wheel, for causing relative movement between said valve elements to open said valve and place said source in communication with the fluid means for turning said second wheel, and further mechanical means, operable by turning movement of said second wheel, for closing said valve to block the passage of fluid from the source to the fluid means for turning said second wheel after said second wheel has turned through a distance generally equal to that of said first wheel.

8. The structure of claim 7 further characterized in that said mechanical means include a linkage between said first wheel and said valve and a second linkage between said second wheel and said valve.

9. In a power steering apparatus for mine shuttle cars and the like, a first pair of wheels and means for turning them, a second pair of wheels and means for turning them, means for turning said second wheels in synchronism with said first wheels including,
a valve having relatively movable elements, a mechanical connection between said first wheels and one of said valve elements, a mechanical connection between said second wheels and another of said valve elements, turning movement of said first wheels causing relative movement between said valve elements, a source of fluid pressure, said valve being connected to said source of fluid pressure and to the means for turning said second wheel, relative movement between said valve elements in response to turning movement of said first wheels placing said source in communication with the means for turning said second wheels, movement of said second wheels causing relative movement between said valve elements, with said valve elements being returned to their original position when said second wheels have turned an amount generally equal to that of said first wheels.

10. The structure of claim 9 further characterized in that both pairs of wheels are turned by fluid means controlled from a generally central location.

11. The structure of claim 9 further characterized in that all of said wheels turn about different fixed points.

12. In a power steering apparatus for mine shuttle cars and the like, a first pair of wheels movable about fixed points, fluid means for turning said first pair of wheels, a second pair of wheels movable about fixed points, fluid means for turning said second pair of wheels, means for turning said second wheels in synchronism with said first wheels, including, a valve having relatively movable elements, a mechanical connection between one of said valve elements and one of said first pair of wheels, a mechanical connection between another of said valve elements and one of said second pair of wheels, turning movement of said first pair of wheels causing relative movement between said valve elements, a source of fluid pressure, a connection between said source and said valve, a connection between the fluid means for turning said second pair of wheels and said valve, relative movement between said valve elements in response to turning movement of said first pair of wheels opening said valve to place said source in communication with the fluid means moving said second pair of wheels, movement of said second pair of wheels causing relative movement between said valve elements, with said valve elements being returned to their original positions when said second pair of wheels have turned an amount generally equal to that of said first pair of wheels.

13. The structure of claim 12 further characterized by a lever pivotal about a fixed point, one end of said lever being connected to said one of said first pair of wheels, the other end of said lever being connected to said one of said valve elements, turning movement of said first pair of wheels causing pivotal movement of said lever which in turn causes relative movement between said valve elements.

14. The structure of claim 12 further characterized in that said one valve element is a valve housing, said other valve element being a valve spool within the housing.

15. The structure of claim 14 further characterized by and including a spring within said housing and urging said housing and spool to a closed position.

References Cited by the Examiner
UNITED STATES PATENTS

| | | | |
|---|---|---|---|
| 2,461,116 | 2/1949 | Jeffrey | 180—79.2 |
| 2,683,496 | 7/1954 | Prost | 180—79.2 |
| 2,874,792 | 2/1959 | Scheuerpflug | 180—79.2 |

BENJAMIN HERSH, *Primary Examiner.*

J. H. BRANNEN, *Assistant Examiner.*